(12) United States Patent
Eleftheriadis et al.

(10) Patent No.: US 11,544,117 B2
(45) Date of Patent: Jan. 3, 2023

(54) METHODS AND ARRANGEMENTS FOR AUTOMATED IMPROVING OF QUALITY OF SERVICE OF A DATA CENTER

(71) Applicant: Telefonaktiebolaget LM Ericsson (publ), Stockholm (SE)

(72) Inventors: Lackis Eleftheriadis, Gävle (SE); Elena Fersman, Stockholm (SE); Jawwad Ahmed, Kista (SE); Farnaz Moradi, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 206 days.

(21) Appl. No.: 16/651,342

(22) PCT Filed: Sep. 27, 2017

(86) PCT No.: PCT/SE2017/050941
§ 371 (c)(1),
(2) Date: Mar. 26, 2020

(87) PCT Pub. No.: WO2019/066690
PCT Pub. Date: Apr. 4, 2019

(65) Prior Publication Data
US 2020/0233703 A1    Jul. 23, 2020

(51) Int. Cl.
*G06F 9/48* (2006.01)
*G06F 9/50* (2006.01)
(Continued)

(52) U.S. Cl.
CPC .............. *G06F 9/5088* (2013.01); *G06F 1/26* (2013.01); *G06F 9/48* (2013.01); *G06F 9/485* (2013.01);
(Continued)

(58) Field of Classification Search
CPC ........ G06F 9/48; G06F 9/4806; G06F 9/4843; G06F 9/485; G06F 9/4856; G06F 9/4881;
(Continued)

(56) References Cited

U.S. PATENT DOCUMENTS 9,594,125 B1    3/2017  Waldron et al.
2005/0257078 A1* 11/2005  Bose .................... G06F 11/008
                                                        714/1
(Continued)

FOREIGN PATENT DOCUMENTS

CN          102937799 A      2/2013

OTHER PUBLICATIONS

Jonathan et al., "Ensuring Reliability in Geo-Distributed Edge Cloud", University of Minnesota, IEEE 978-1-5090-6055, Sep. 2017, IEEE, pp. 127-132 (Year: 2017).*
(Continued)

*Primary Examiner* — Charles M Swift
(74) *Attorney, Agent, or Firm* — Nicholson De Vos Webster & Elliott LLP

(57) ABSTRACT

An automated improving of quality of service of a data center. Transients of a power grid fed to a power supply unit are monitored by a probe. Information on transients is provided across an interface to a server of the data center. Based on characteristics of the transients, a reliability of the data center is subjected to automated updating. A request for migration of workload requiring a higher reliability than the updated reliability can be sent to a central management. When the central management has identified another data center that can meet the required reliability, the central management migrates or relocates the workload to the another data center.

15 Claims, 5 Drawing Sheets

(51) Int. Cl.
  *G06F 11/30* (2006.01)
  *G06F 1/26* (2006.01)
  *G06Q 50/06* (2012.01)
  *G06F 9/455* (2018.01)
(52) U.S. Cl.
  CPC .......... *G06F 9/4806* (2013.01); *G06F 9/4843* (2013.01); *G06F 9/4856* (2013.01); *G06F 9/4881* (2013.01); *G06F 9/4893* (2013.01); *G06F 9/50* (2013.01); *G06F 9/5005* (2013.01); *G06F 9/5083* (2013.01); *G06F 9/5094* (2013.01); *G06F 11/3058* (2013.01); *G06F 11/3062* (2013.01); *G06F 11/3089* (2013.01); *G06Q 50/06* (2013.01); *G06F 9/45533* (2013.01)
(58) Field of Classification Search
  CPC .... G06F 9/4893; G06F 11/30; G06F 11/3058; G06F 11/3062; G06F 11/3089; G06F 9/45533; G06F 1/26; G06F 9/50; G06F 9/5005; G06F 9/50836; G06F 9/5088; G06F 9/5094; G06Q 50/94
  See application file for complete search history.

(56) References Cited

U.S. PATENT DOCUMENTS

| | | |
|---|---|---|
| 2012/0096169 A1 | 4/2012 | Oeda |
| 2012/0173708 A1 | 7/2012 | Bartfai-Walcott et al. |
| 2014/0189706 A1* | 7/2014 | Baek ...................... G06F 9/5094 718/104 |
| 2015/0051749 A1 | 2/2015 | Hancock et al. |
| 2016/0019084 A1 | 1/2016 | Forestiero et al. |
| 2017/0068963 A1* | 3/2017 | Saxena ................ G06Q 30/016 |
| 2018/0076662 A1* | 3/2018 | Maheshwari ..... H02J 13/00002 |

OTHER PUBLICATIONS

Bose, Anjan, "Smart Transmission Grid Applications and Their Supporting Infrastructure", IEEE Transactions on Smart Grid, vol. 1, No. 1, Jun. 2010, pp. 11-19.
International Preliminary Reporton Patentability, PCT App. No. PCT/SE2017/050941, dated Apr. 9, 2020, 9 pages.
International Search Report and Written Opinion, PCT App. No. PCT/SE2017/050941, dated Jul. 6, 2018, 12 pages.
Supplementary Partial European Search Report and Search Opinion, EP App No. 17927111.9, dated Jun. 14, 2021, 9 pages.
Verma et al., "pMapper: Power and Migration Cost Aware Application Placement in Virtualized Systems", IFIP International Federation for Information Processing 2008, Dec. 2008, pp. 243-264.

\* cited by examiner

METHODS AND ARRANGEMENTS FOR AUTOMATED IMPROVING OF QUALITY OF SERVICE OF A DATA CENTER

CROSS-REFERENCE TO RELATED APPLICATIONS

This application is a National stage of International Application No. PCT/SE2017/050941, filed Sep. 27, 2017, which is hereby incorporated by reference.

TECHNICAL FIELD

This disclosure relates to improving a quality of service (QoS) of a data center. More particularly, it relates to methods and arrangements for automated improving of QoS of a data center.

BACKGROUND

Currently, many data centers (DC) around the world suffer from bad or unstable alternating current (AC) grid. Even if a DC has a high redundant, and high reliability, power configuration, its power system will be subjected to transients, due to low quality grid, at the input of the power system. Transients having high amplitude are typically strong, and when occurring on an input of a power supply unit (PSU), they can cause damage to equipment to which the PSU provides power.

Some power systems of data centers are required to have a redundant power supply feeding, which increases the reliability for the server infrastructure of such data centers. Even so, high-level transients on the AC grid, indicating a non-reliable power grid, have a high impact on the power system.

FIG. 1 schematically present a data center (DC) 10 according to the prior art. The data center 10 comprises a power system 12 and a server 14, where the power system 12 comprises at least one power supply unit (PSU) 13. A power grid 11 is connected to an input of the PSU 13. The power system 12 provides power to the server 14. The power system 12 can also provide information comprising voltage, current, temperature, and optionally fan-controlled data of the power system 12 to the server 14. It has been noticed that it is difficult to achieve a reliable data center operation, based on this information.

The server 14 may further comprise a memory unit 15 and a central processing unit (CPU) 16.

Moreover, reliability data still have to be manually incorporated into servers of data centers, which is time-consuming and due to manual operation, calculation of reliability may become erroneous.

Also, reliability data is often received from different suppliers, for which reason mergers of received reliability data may be miscalculated and non-properly implemented.

Erroneous reliability data typically affect the QoS by service degradation, downtime and/or data loss.

There is thus a demand for an improved technique circumventing or at least diminishing issues associated with transients on an AC grid connected to a PSU of a data center.

SUMMARY

It is an object of exemplary embodiments herein to address at least some of the issues outlined above and to consider transients detected on a power grid connected to a power supply unit of a data center, according to the appended independent claims, and by the exemplary embodiments according to the dependent claims.

This object and others are achieved by a method of automated improving of quality of service of a data center. The method is performed in a server, according to embodiments of the present disclosure. The data center comprises a power supply unit and the server having a workload. A power grid is fed to a power input of the power supply unit, and a power output of the power supply unit is connected to, and provides power to, the server. A probe, being adapted to detect transients on a power grid is connected to the power input of the power supply unit and to provide information over a signaling interface to the server, detects transients on the power grid. The method comprises receiving, from the probe across the signaling interface, information about transients being detected on the power grid. The method also comprises automated updating a reliability of the data center, based on the received information about transients being detected. In addition, the method comprises sending, to a central management system, a request for migration of the workload, when the updated reliability of the data center is lower than a reliability required by the workload.

This object and others are achieved by a method performed in a central management server or a central manager, according to embodiments of the present disclosure. The method is a method of improving a quality of service of two or more data centers, each having a workload. The central management server is connected to said two or more data centers located at different locations, and has information about a reliability of each one of said two or more data centers. The method comprises receiving from a first of said two or more data centers a request for migration of a workload from a server within said first data center, when an updated reliability of the first data center is lower than a reliability required by the workload, where the request is triggered by transients detected on a power input of a power supply unit that provides power to the server within the first data center. The method also comprises identifying a second data center of said two or more data centers, said second data center having a reliability that is equal to, or higher than, the reliability that is required by the workload. In addition, the method comprises migrating the workload to the second data center.

This object and others are achieved by a server of a datacenter, according to embodiments of the present disclosure. The server is capable of automated improving a quality of service of a data center, the data center comprising a power supply unit and the server. The server is adapted to have a workload, where the power supply unit has a power input that is adapted to be fed by a power grid. The power output of the power supply unit is adapted to be connected and to provide power, to the server, where a probe is connected to the power input of the power supply unit, said probe being adapted to detect transients on the power grid and to provide information over a signaling interface to the server. The server comprises a processing circuitry and a memory, said memory containing instructions being executable by said processing circuitry whereby said server is operative to receive, from the probe across the signaling interface information about transients being detected on the power grid. Said memory further contains instructions being executable by said processing circuitry whereby said server is operative to update the reliability of the data center, based on the received information about transients being detected, where the update is automated. In addition, said memory also contains instructions being executable by said processing circuitry whereby said server is operative to send, to a central management server, a request for migration of the workload, when the updated reliability of the data center is lower than a reliability required by the workload.

This object and others are achieved by a central management server, according to embodiments of the present disclosure. The central management server is capable of improving a quality of service of two or more data centers, each having a workload. The central management server is adapted to be connected to said two or more data centers located at different locations. The central management server is adapted to have information about a reliability of each one of said two or more data centers. The central management server comprises a processing circuitry and a memory. The memory contains instructions executable by said processing circuitry whereby the management server is operative to receive from a first of said two or more data centers a request for migration of a workload from a server within said first data center, when an updated reliability of the first data center is lower than a reliability required by the workload, where the request is triggered by transients detected on a power input of a power supply unit providing power to the server within the first data center.

The memory also contains instructions executable by said processing circuitry whereby the management server is operative to identify a second data center of said two or more data centers, said second data center having a reliability that is equal to, or higher than, the reliability that is required by the workload.

In addition, the memory contains instructions executable by said processing circuitry whereby the management server is operative to migrate the workload to the second data center.

Examples and embodiments as described have one or more of the following advantages and preferable features:

It is an advantage that the method of the improving of quality of service of a data center is automated.

It is advantages that methods herein are continuously performed.

It is an advantage that relocation or migration of workload based on updated reliability data is automated.

It is a further advantage of the present disclosure that updating of data center reliability is automated.

It is a further advantage of the present disclosure that updating of data center reliability is automated.

BRIEF DESCRIPTION OF THE DRAWINGS

Embodiments will now be described in more detail, and with reference to the accompanying drawings, in which.

DETAILED DESCRIPTION

Figure 1:
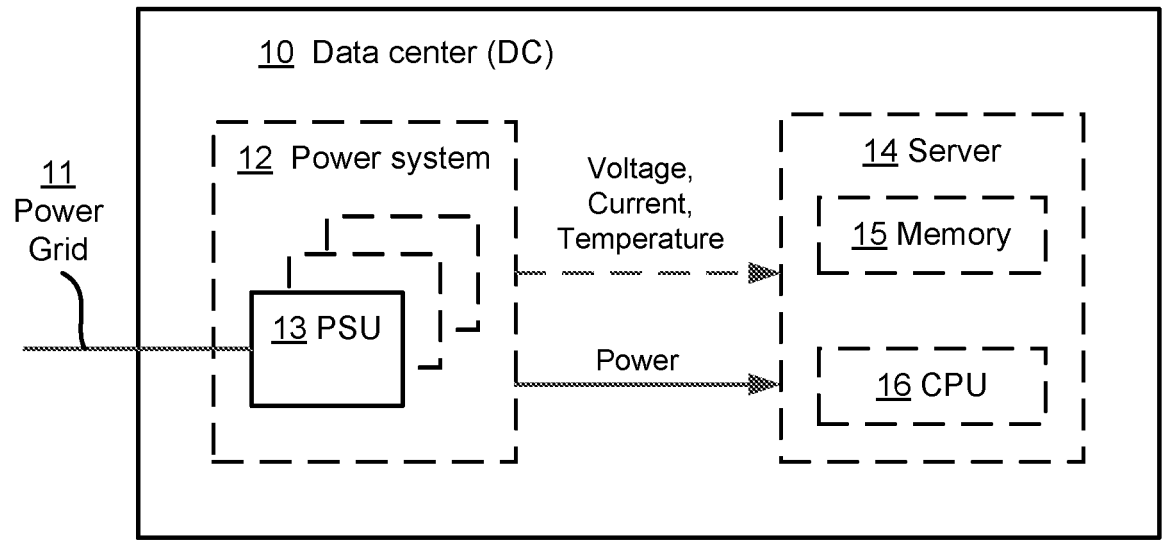
FIG. 1 schematically illustrates a data center according to the prior art.

In the following description, exemplary embodiments will be described in more detail, with reference to accompanying drawings. For the purpose of explanation and not limitation, specific details are set forth, such as particular examples and techniques in order to provide a thorough understanding.

Hence, there is a demand for an improved technique circumventing or at least diminishing issues associated with transients on an AC grid connected to a PSU of a data center.

Power systems of currently available data centers do not act on conditions of transients occurring on AC grids connected to said power systems. Conditions of transients are thus not reported to the server infrastructure or orchestrator of the data center. Hence transients may thus occur or appear unnoticed on the power grid, i.e. AC grid at the power system input. This is indeed a problem, since these transients can have a large impact on the reliability of an entire data center site.

It is herein proposed to take into account transients detected on the AC grid and to act on these transients. By taking transients into account in a data center, the QoS that the data center can provide to workloads is improved.

In short, based on transients detected on the AC grid connected to an input of a PSU, an automated updating of the reliability of the data center is performed.

By incorporating detection of transients affecting the data center and methods to act on them, the reliability of the data center is, as such, increased. Also, based on the strength of the detected transients, and the number or rate of the transients, the reliability is updated. If a strength of detected transients changes from, for instance, 20% of the nominal voltage or amplitude, to, for instance, 10% of the nominal voltage or amplitude, the reliability may be increased.

Moreover, by detecting AC grid transients, using a method performed within a local data center, a local manager within a server of the data center may request a global manager to relocate, or migrate, a workload from the data center, based on the behavior of transients on the AC grid applying predetermined thresholds.

The global manager is adapted to be connected to two or more data centers and to have information about the reliability of each of these two or more data centers. Having this information the global manager can, upon receipt of a request from a data center for migration of a workload requiring certain reliability, determine which one of the two or more data centers to migrate the workload to. The data center to which the workload is migrated or relocated to, is required to meet the reliability requirement of the workload, i.e. the data center to which the workload is to be migrated to, is required to have a reliability equal to, or higher than the reliability required by the workload. This data center to which the workload is to be migrated or relocated to, is hence fed by an AC grid having a higher quality, i.e. having lower and/or fewer transients as compared to the data center from which the workload was migrated, or relocated.

The global manager hence needs information about the reliability of the two or more data centers. Each data center may have associated a tag that comprises information about its reliability. These tags may be stored in a database to which the global manager has access. By accessing the database, the global manager may thus obtain information about the reliability of each of these two or more data centers. By accessing the database and reading these tags, the global manager may thus create a reliability map covering the data centers. Reliability information, for instance in the form of the reliability map, need to be obtained by the global manager, prior to receiving the request for migrating or relocating a workload from one of the two or more data centers. This map may be dynamically updated by the global manager.

The data center, to which the workload is to be migrated or relocated, is hence located at a location that differs from the location of the data center from the workload was migrated or relocated.

Operators of data centers of today are often required to increase their reliability on the data center site infrastructure to improve the quality of service (QoS) of the data center for customers.

Today, the increase of reliability of the data center is today handled manually, by means of adding hardware infrastructure equipment, such as, power system, redundant battery banks, adding a redundant AC power feeding (grid A+B) supplying a server infrastructure to achieve the increase.

As indicated above, reliability information of servers at a server site is today manually inserted on the servers or on databases of the global manager for different use cases.

Even when a data center site has a high reliability, the reliability can easily be affected by AC grid transients, which may have a high impact on the reliability of the power system of the data center. This reliability impact, caused by AC transients, is today not forwarded or informed to the global manager that may handle the reliability parameters of the data center site.

Figure 2:
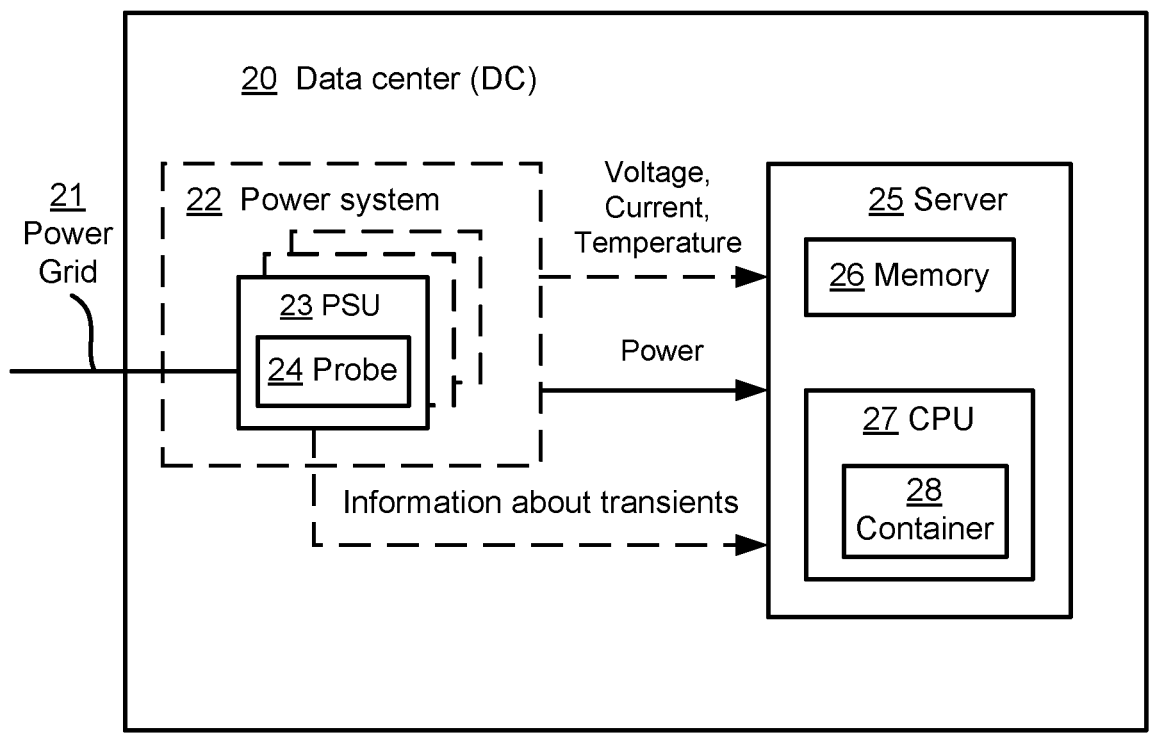
FIG. 2 schematically illustrates a data center related to embodiments of the present disclosure.

FIG. 2 a schematic illustration of a data center 20 that is related to embodiments of the present disclosure. The data center 20 comprises a power system 22 and a server 25, where the power system 22 comprises at least one power supply unit (PSU) 23. A power grid 21 is connected to an input of said at least one PSU 23.

Said at least one PSU 23 of the power system 22 also comprises a probe 24 that is connected to the input of said at least one PSU 23. The probe 24 is adapted to detect transients on the power grid 21 and to provide information about detected transients to the server 25. The probe 24 may be comprised within said at least one PSU 23 and may hence be internally connected to said at least one PSU 23. Alternatively, the probe may be external to said at least one PSU 23, but connected to the input of sad at least one PSU 23. The probe 24 may be a passive probe.

The power system 22 is adapted to provide power to the server 25. The power system 22 is also adapted to provide information comprising voltage, current, and temperature to the server 25. The server 25 further comprises a memory unit 26 and a central processing unit (CPU) 27. The CPU 27 may be adapted to comprise a container 28 in which an automated improving of quality of service (QoS) of the data center is being calculated.

The information about transients detected by the probe 24, is provided to the server 25 over a novel interface. This interface is a signaling interface.

Figure 3:
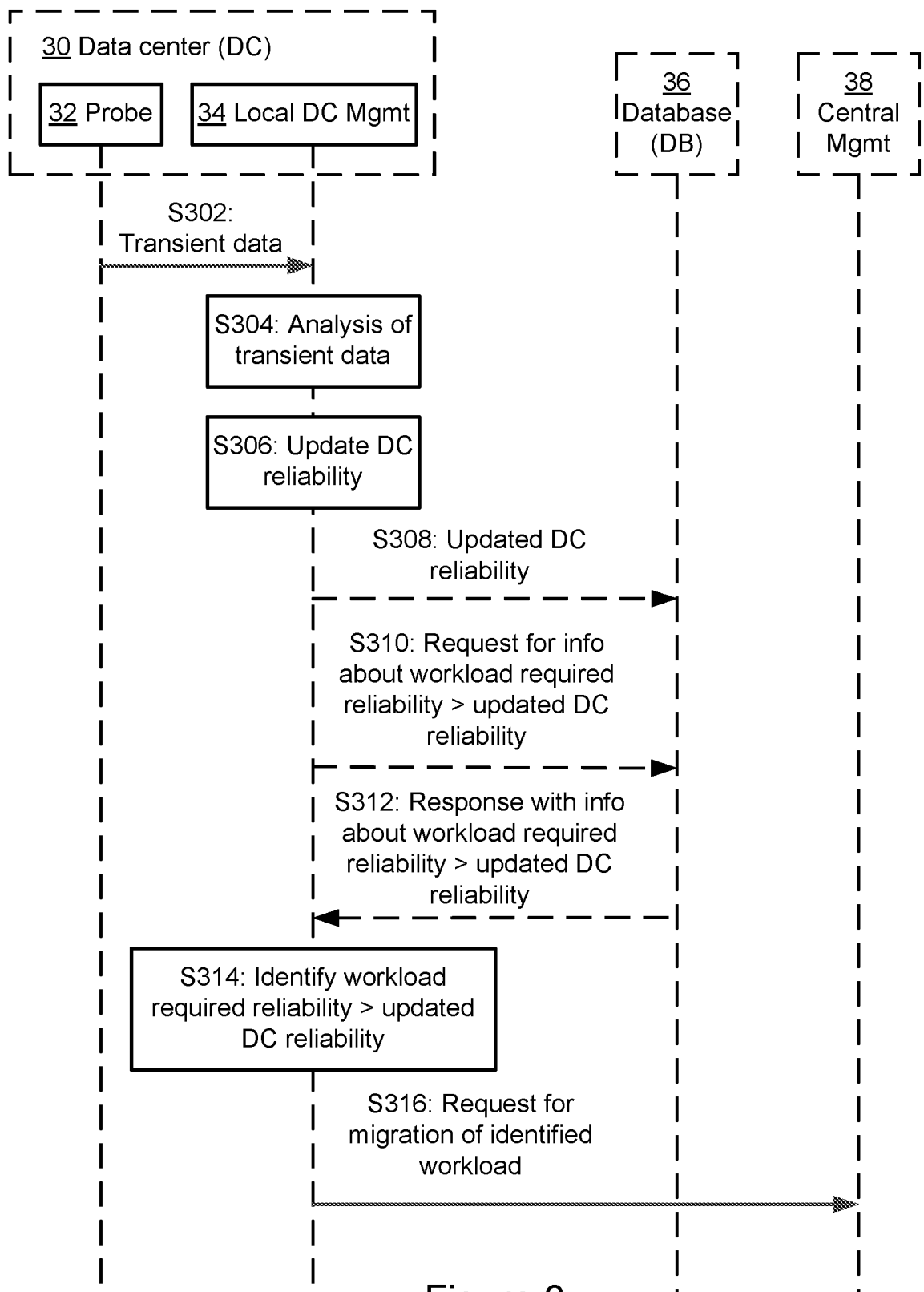
FIGS. 3 and 6 illustrate handshake diagrams, related to embodiments of the present disclosure.

FIG. 3 illustrates an overall handshake diagram, related to embodiments of the present disclosure. The handshake diagram comprises handshaking between a data center 30, a database (DB) 36 and a central management 38. The data center 30 comprises a probe 32 and a local data center (DC) management 34.

The probe 32 is configured to detect transients on an input of at least one PSU of the data center 30.

Action S302: The probe 32 sends over a signalling interface, information or data about transients being detected by the probe 32, to the local DC management 34. The local DC management may be represented by the server 25 is FIG. 2.

Action S304: The local DC management 34 performs an analysis the information about transient data. This analysis may be based on further information received from the DB 36.

Action S306: The local DC management 34 updates the reliability of the data center, based on the analysis of detected transients. The DC reliability may either be decreased or increased, based on said analysis.

Action S308: The local DC management 34 may send the updated DC reliability to the DB 36.

Action S310: The local DC management 34 may send, to the DB 36, a request for information about workload, residing on the data center 30, which have a required reliability that is higher than the updated reliability of the data center.

Action S312: The local DC management 34 may hence receive a response having information about workload that requires a reliability that is higher than the updated reliability of the data center 30.

Action S314: The local DC management 34 identifies workload residing on the data center, where this workload has a required reliability that is higher than the updated reliability. This identification may be based on information as received in action S312. This identification may also, or alternatively, be based on information earlier obtained by the local DC management Action S316: The local DC management 34 sends a request, to the central management 38, for migration, or relocation, of workload identified in action S314. By sending this request in action S316, migration or relocation to another data center is enabled, said another data center having a reliability that is equal to, or higher than, the reliability of the workload being subjected to migration or relocation.

As will be described down below the central management 38 may have information accessible about the reliability one or more other data centers.

It is noted that the local DC management 34 of the data center may be located in the container 28 or in a similar node, such a virtual machine 30.

The central management may be located in an orchestrator that orchestrates several virtual containers or virtual machines of two or more data centers.

It is noted that the functionality being processed within each virtual container or virtual machine (VM) may either be locally executed, for instance by each local DC management 34 or be distributed and executed from other data center locations.

Figure 4:
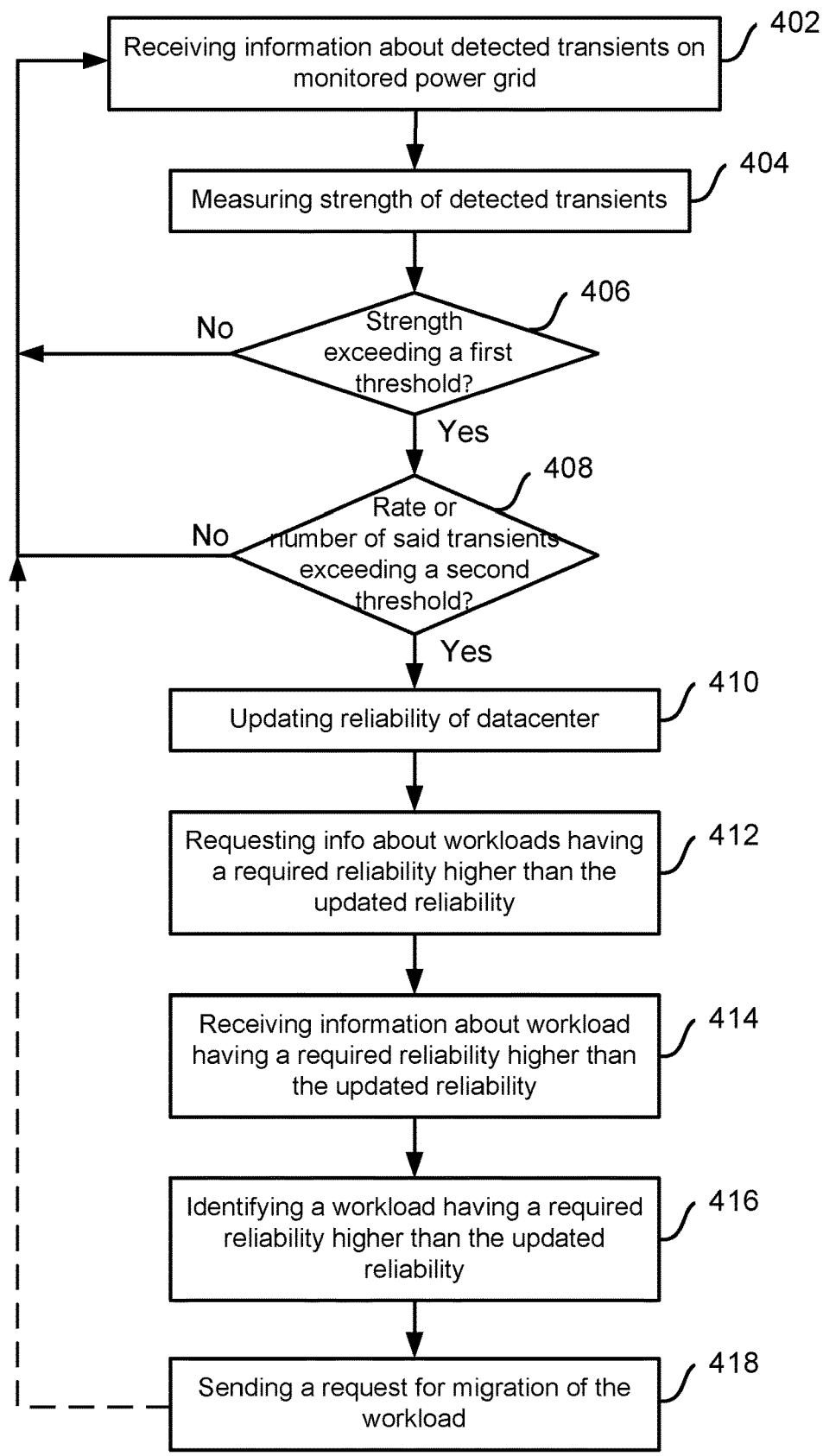
FIG. 4 illustrates a flow chart of actions performed in a server, according to embodiments of the present disclosure.

FIG. 4 illustrates a flow chart of actions performed in a server, according to embodiments of the present disclosure. These actions form one or more embodiments of a method of automated improving of quality of service (QoS) of a data center, where the data center comprises a PSU and the server having a workload. A power grid is further fed to a power input of the PSU and a power output of the PSU is connected and provides power to the server. A probe being adapted to detect transients on a power grid is connected to the power input of the PSU and is adapted to provide information over a signalling interface to the server. Within these actions, the probe detects transients on the power grid. These actions are moreover performed by the server. The flowchart comprises:

Action 402: Receiving information about detected transients on monitored power grid.

Action 404: Measuring strength of detected transients. Transient strength may be measured in terms of its amplitude, shape, and/or its duration in time.

Action 406: Determining whether the measured strength exceeds a first threshold, or not. If the measured strength of the detected transients do not exceed said first threshold, action 406 is responded to by "No", and normal operation is at hand, for which next action is action 402. It is emphasized that this first threshold can be dynamically changed and set, according to reliability required by workload residing on the data center.

If the measured strength of the detected transients exceeds the first threshold in action 406, i.e. when action 406 can be answered by "Yes", the next action is action 408.

Action 408: Determining whether the rate, or number, of said transients exceeds a second threshold, or not. The second threshold may for instance be a dynamically settable number, e.g. 5. It is thus then determined whether the transients which already exceed the first threshold, are more than or less than 5. This number of transients may be determined by collecting transients detected within a predefined time duration. It is also emphasized that the second threshold can be dynamically changed and set. This second threshold may also be changed and set according to reliability required by workload residing on the data center.

If the rate or number of detected transients does not exceed the second threshold, action 408 is answered by "No" and next action is action 402.

If the rate or number of detected transients exceeds the second threshold, for instance, it exceeds 5, action 408 is answered by "Yes" and next action is action 410.

Action 410: Updating reliability of data center, based on transients detected. Updating as comprised in this flow-chart comprises to decrease the reliability of the data center. It is noted that updating of the reliability of the data center, in general, may comprise increasing the reliability of the data center, based on strength and rate.

Action 412: Requesting information about workload having a required reliability higher than the updated reliability of action 410. This request may be sent to a database comprising information about the required reliability of each workload residing in the data center.

This database may for each workload comprise a tag, where each tag comprises information about the required reliability of each workload. The required reliability of the workload typically varies in time, for which reason the reliability is typically dynamic.

Action 414: Receiving information about workload having a required reliability higher than the updated reliability of the data center.

Action 416: Identifying a workload having a required reliability that is higher than the updated reliability of the data center.

Action 418: Sending a request for migration or relocation of the identified workload.

Having sent this request, the flow chart continues by action 402, thus providing a closed loop flow chart. An automated and continues flow of actions is hereby disclosed.

Figure 5:
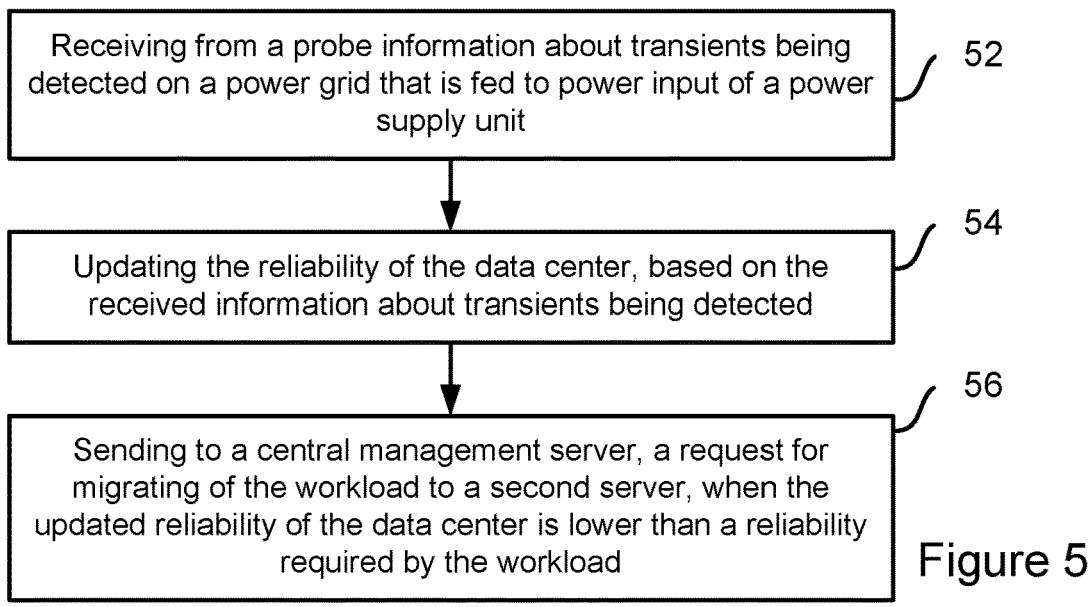
FIG. 5 illustrates actions within a method performed in a server, according to embodiments of the present disclosure.

FIG. 5 illustrates actions within a method of automated improving of QoS of a data center, the method being performed in a server, according to embodiments of the present disclosure. The data center comprises a PSU and the server having a workload. A power grid is fed to a power input of the PSU, and a power output of the PSU is connected to, and provides power to, the server. A probe, being adapted to detect transients on a power grid is connected to the power input of the PSU and to provide information over a signaling interface to the server, detects transients on the power grid. The method comprises receiving 52, from the probe across the signaling interface, information about transients being detected on the power grid. The method also comprises automated updating 54 a reliability of the data center, based on the received information about transients being detected. In addition, the method comprises sending 56, to a central management system, a request for migration of the workload, when the updated reliability of the data center is lower than a reliability required by the workload.

This method may further comprise requesting S310, from a database, the reliability required by the workload; and receiving S312 from the database the requested reliability required by the workload.

Within this method, receiving information about transients may also comprise receiving information about the strength of detected transients, and about the number or rate of the detected transients having said strength.

Sending S316, 418, 56 the request in this method may also comprise detecting that the updated reliability of the data center is lower than the reliability required by the workflow, when the information about transients detected by the probe comprises that the number, or rate, of transients exceeds a pre-determined second threshold, and that said strength exceeds a pre-determined first threshold.

Within this method, the first and second thresholds may be obtained from the database.

Updating S306, 410, 54 the reliability within this method may be performed periodically.

The reliability that is required by the workload may be coded in a tag that is stored in the database.

The PSU 23 may be comprised within a power system 22 infrastructure of the data center 20, and the server may be comprised within a server infrastructure of the data center 20.

This method may be performed by a data center management 83 within the server. The data center management 83 may reside in a container or a virtual machine 29 of the server.

Figure 6:
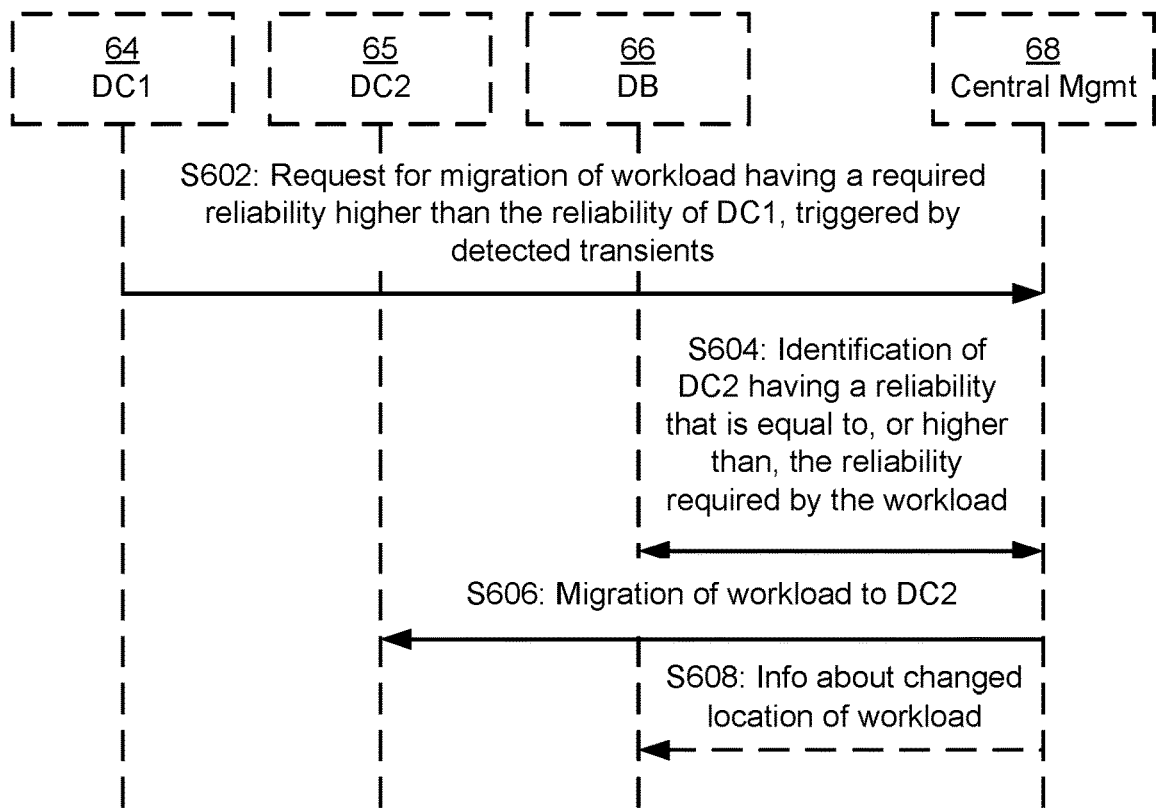

FIG. 6 illustrates a handshake diagram, related to embodiments of the present disclosure. Handshaking is here performed between nodes comprising data center DC1 64, DC2 65, database DB 66 and central management 68. The DC1 64 and DC2 65 are typically positioned at different locations, and hence fed by different power grids. The power grid that is connected to a PSU of DC 1 is thus different from the power grid hat is connected to a PSU of DC 2.

The DB 66 may be located divided into two databases; one in each DC. The central manager is adapted to be connected to DC1 64, DC2 65 and to DB 66.

Upon identification that there is workload present in DC1 64 where said workload has a required reliability that is higher than the reliability of DC1 64 the, following handshake diagram may start:

Action S602: DC1 64 sends a request for migration, or relocation, of the workload having the required reliability higher than the reliability of DC1. This request is sent to the central management 68. This request is triggered by transients being detected by DC1 64, these transients causing the reliability of DC1 64 to be updated and decreased to become lower than the reliability required by the workload.

Action S604: The central management 68 identifies another DC, here DC2 65 having a reliability that is equal to, or higher than, the reliability required by the workload. The central management 68 may perform this identification by accessing the DB 66, having information about the reliability of different data centers. Data centers being connected to power grids with no, or low, or even very low transients on the grid will have a relatively higher reliability or high quality reliability.

Based on decisions or instructions of the orchestrator that is orchestrating data centers, threshold values can be set in each data center. The orchestrator may decide criteria when each data center needs to send a request for migration or relocation of workload. For instance, when a probe of a data center has detected that 5 transients having at least a predefined strength, an updated reliability of the data center can no longer meet a reliability of a workload of that data center. A request must hence be sent to the central management or orchestrator orchestrating the data centers, or migrating or relocating workload in question.

Action S606: Once the central management 8 has identified said another DC, i.e. DC 2 65 having a reliability that meets he reliability of the workload in question, said workload is migrated from DC 1 to DC 2.

Action 608: Information about changed location of workload is sent to DB 66 and stored.

Figure 7:
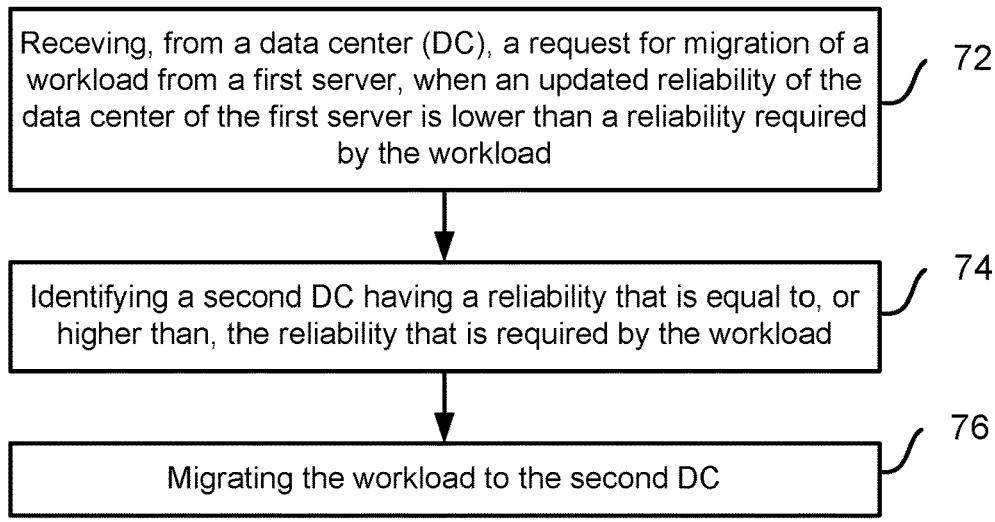
FIG. 7 illustrates actions within a method performed in a central management server, according to embodiments of the present disclosure.

FIG. 7 illustrates actions within a method performed in a central management server or a central manager, according to embodiments of the present disclosure. The method is a method of improving a quality of QoS of two or more data centers 64, 65, 81, 85 each having a workload. The central management server is connected to said two or more data centers located at different locations, and has information about a reliability of each one of said two or more data centers.

The method comprises receiving 72 from a first of said two or more data centers a request for migration of a workload from a server within said first data center, when an updated reliability of the first data center is lower than a reliability required by the workload, where the request is triggered by transients detected on a power input of a PSU that provides power to the server within the first data center.

The method also comprises identifying a second data center DC of said two or more data centers, said second data center having a reliability that is equal to, or higher than, the reliability that is required by the workload.

In addition, the method comprises migrating the workload to the second DC.

The method being performed in the central management server, or central manager, may comprise periodically receiving updated information about the reliability of said two or more data centers. This information may be received from one or more databases.

The method may be performed by an orchestrator of the central management server, said orchestrator orchestrating the data centers.

It is an advantage that the methods described here are automated. By incorporating these methods in existing data centers, the QoS of the data centers for the data center services or workload is improved. This is particularly useful for services being mission critical and requiring a high reliability.

Figure 8:
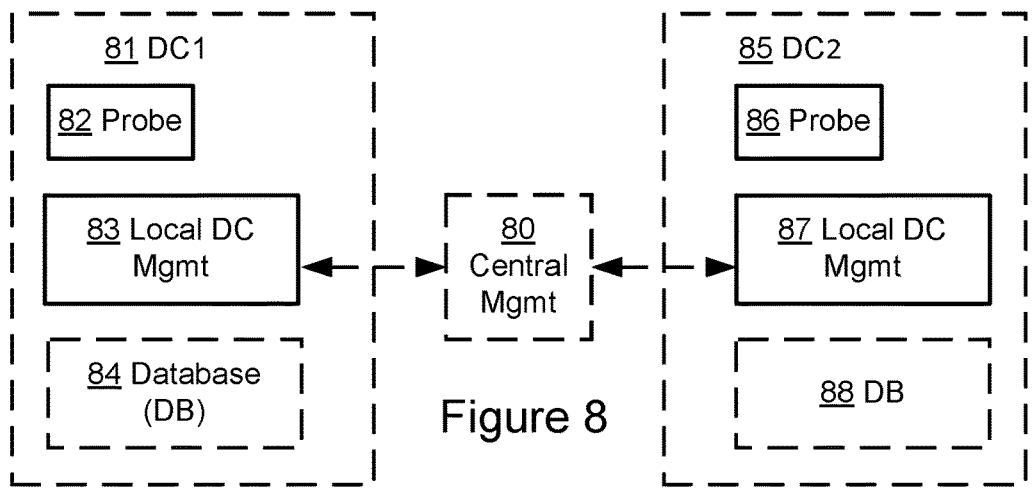
FIG. 8 illustrates an architecture related to embodiments of the present disclosure.

FIG. 8 illustrates an exemplifying architecture related to embodiments of the present disclosure.

This architecture comprises a central management 80 that is connected to a data center DC1 81 and a DC2 85. The DC1 and DC2 are typically positioned at different locations, enabling them to be fed to power grids of different or varying quality.

The DC1 comprises a probe 82, and a local DC management 83. The DC1 81 may also comprises a DB 84, which may be a shared DB or part of database 66 from FIG. 6.

Similarly, DC2 85 comprises a probe 86, and a local DC management 87. The DC2 85 may also comprise a DB 88, which may be a shared DB or part of the database 66.

It is noted that different data centers typically have different reliability around the world. Having these method implemented on specified data centers having a low quality power grid behavior, i.e. a power grip on which several transients of at least a predefined strength occur, requests can be sent to the central manager. These requests for migration or relocation of workload may comprise the reliability of the data center sending the request. The request may also comprise the state of the workload in question, having a required reliability higher than the reliability of the data center. Also, the request for migration or relocation may also comprise the location, i.e. the identity of the data center currently residing the workload in question.

Figure 9:
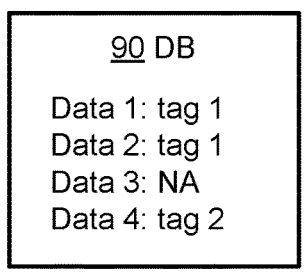
FIG. 9 schematically illustrates a database, related to embodiments of the present disclosure.

FIG. 9 schematically illustrates a database DB 90, related to embodiments of the present disclosure. The DB 90 comprises information about the reliability that is required by each workload or data. This information may be stored in a tag. There may be several tags, dependent on the required reliability; one tag for each reliability requirement.

For instance, "Data 1" and "Data 2" have "tag 1", i.e. workload "Data1" and workload "Data 2" have the same reliability requirement. "Data 3" has no specified tag, which may mean that this workload "Data 3" has no special reliability requirement. "Data 4" has "tag 2", i.e. a reliability requirement that is different from "Data 1" or "Data 2".

By adding associating a tag to each workload or data in a database, the central management server, or central manager, can obtain information about the reliability requirement of each workload or data.

Data centers having a relatively low reliability will thus host workload or data having no or at most an equally low reliability requirement. The tags in a database of a data center, or in data center-specific databases, such as DB 84 and DB 88 in FIG. 8, lend a reliability quality to the data center.

If a data center has present workload or data with high reliability requirement, the data center can be regarded to be a high quality data center. Similarly, when a data center has present workload or data with low reliability requirement, and none with a high reliability requirement, the data center can be regarded to be a low quality data center.

A database connected to a data center, may alternatively, or also contain explicit information about the reliability of the data center.

Based on tag information, the central management server or orchestrator may thereby create a map of the different reliabilities of different data centers. For instance, the orchestrator can easily obtain information about which data centers have had frequent high strength transients. Based on reliability information being mapped, the orchestrator can identify which data center to send a certain workload or data to.

It is emphasized that this map may be dynamically updated periodically or on demand based on the changing reliability conditions of different data centers.

Moreover, in the case many data centers are affected and experience an impact triggered on grid transients, the central management server or central manager may prioritize services, by the importance of said services, for data or workload migration. A high priority service may hence be migrated or relocated prior to a low or non-priority service.

Figure 10:
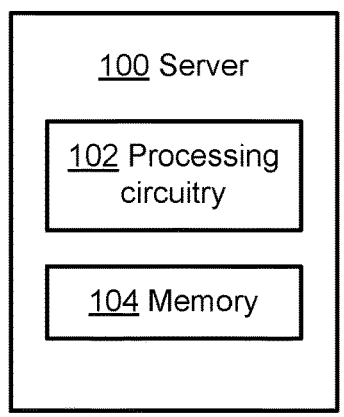
FIGS. 10 and 11 schematically present a server and a central management server, respectively, according to embodiments of the present disclosure.

FIG. 10 schematically presents a server 100 of a datacenter, according to embodiments of the present disclosure. The server 100 is capable of automated improving a QoS of a data center 20, 30, 64, 65, 81, 85, the data center comprising a PSU 23 and the server 100. The server is adapted to have a workload, where the PSU has a power input that is adapted to be fed by a power grid 21, where a power output of the PSU is adapted to be connected and to provide power, to the server, where a probe 24, 82, 86 is connected to the power input of the PSU, said probe being adapted to detect transients on the power grid and to provide information over a signaling interface to the server 100. The server comprises a processing circuitry 102 and a memory 104, said memory containing instructions being executable by said processing circuitry 102 whereby said server 100 is operative to receive, from the probe across the signaling interface information about transients being detected on the power grid. Said memory further contains instructions being executable by said processing circuitry 102 whereby said server 100 is operative to update the reliability of the data center, based on the received information about transients being detected, where the update is automated. In addition, said memory also contains instructions being executable by said processing circuitry 102 whereby said server 100 is operative to send, to a central management server, a request for migration of the workload, when the updated reliability of the data center is lower than a reliability required by the workload.

The memory 104 may further contain instructions executable by said processing circuitry whereby said server is further operative to request, from a database, the reliability required by the workload, and to receive from the database the requested reliability required by the workload.

The memory 104 may further contain instructions executable by said processing circuitry whereby said server is further operative to receive information about a strength of transients being detected, and about the number, or rate, of the detected transients having said strength.

The memory 104 may also contain instructions executable by said processing circuitry whereby said server is further operative to detect that the updated reliability of the data center is lower than the reliability required by the workflow, when the information about transients detected by the probe comprises that the number, or rate, of the transients exceeds a pre-determined second threshold, and that said strength exceeds a pre-determined first threshold.

The memory 104 may also contain instructions executable by said processing circuitry whereby said server is further operative to update the reliability periodically.

The reliability that is required by the workload may be coded in a tag that is stored in the database.

The probe within the server 100 may comprise a passive probe.

The PSU 23 of the data center may be comprised within a power system 22 infrastructure of the data center 20. The server may be adapted to be comprised within a server infrastructure of the data center 20.

Figure 11:
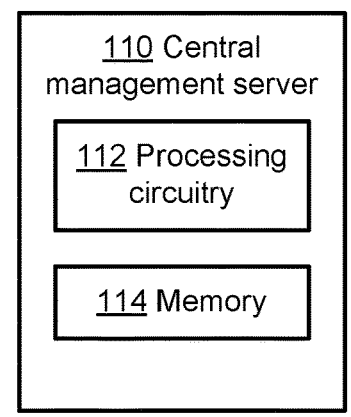

FIG. 11 schematically presents a central management server 110, according to embodiments of the present disclosure. The central management server 110 is capable of improving a QoS of two or more data centers 64, 65, 81, 85 each having a workload. The central management server is adapted to be connected to said two or more data centers located at different locations. The central management server is adapted to have information about a reliability of each one of said two or more data centers. The central management server comprises a processing circuitry 112 and a memory 114. The memory 114 contains instructions executable by said processing circuitry 112 whereby the management server is operative to receive from a first of said two or more data centers a request for migration of a workload from a server within said first data center, when an updated reliability of the first data center is lower than a reliability required by the workload, where the request is triggered by transients detected on a power input of a PSU providing power to the server within the first data center.

The memory 114 also contains instructions executable by said processing circuitry 112 whereby the management server is operative to identify a second data center of said two or more data centers, said second data center having a reliability that is equal to, or higher than, the reliability that is required by the workload.

In addition, the memory 114 contains instructions executable by said processing circuitry 112 whereby the management server is operative to migrate the workload to the second data center.

The memory 114 may also contain instructions executable by said processing circuitry 112 whereby said server is operative to periodically receive updated information about the reliability of said two or more data centers.

The present disclosure also comprises a server of a datacenter, according to embodiments of the present disclosure. The server is capable of automated improving a QoS of a data center 20, 30, 64, 65, 81, 85, the data center comprising a PSU 23 and the server. The server is adapted to have a workload, where the PSU has a power input that is adapted to be fed by a power grid 21, where a power output of the PSU is adapted to be connected and to provide power, to the server, where a probe 24, 82, 86 is connected to the power input of the PSU, said probe being adapted to detect transients on the power grid and to provide information over a signaling interface to the server. The server is adapted to receive, from the probe across the signaling interface information about transients being detected on the power grid. The server is also adapted to update the reliability of the data center, based on the received information about transients being detected, where the update is automated. In addition, said server is adapted to send, to a central management server, a request for migration of the workload, when the updated reliability of the data center is lower than a reliability required by the workload.

The present disclosure also comprises a central management server, according to embodiments of the present disclosure. The central management server is capable of improving a QoS of two or more data centers 64, 65, 81, 85 each having a workload. The central management server is adapted to be connected to said two or more data centers located at different locations. The central management server is adapted to have information about a reliability of each one of said two or more data centers. The central management server is also adapted to receive from a first of said two or more data centers a request for migration of a workload from a server within said first data center, when an updated reliability of the first data center is lower than a reliability required by the workload, where the request is triggered by transients detected on a power input of a PSU providing power to the server within the first data center.

The central management server is also adapted to identify a second data center of said two or more data centers, said second data center having a reliability that is equal to, or higher than, the reliability that is required by the workload.

In addition, the central management server is also adapted to migrate the workload to the second data center.

The present disclosure thus considers detected transients at the input of one or more PSUs of a power system of a data center. By involving the orchestrator orchestrating the virtual containers or virtual machines, workloads or workflows are successfully secured via said migration or relocation.

The present disclosure has thus described automated methods of improving QoS of datacenters, based on detected transients and their behavior.

The present disclosure also comprises a novel signaling interface over which information about detected transients can be sent from a PSU to a server that it provided power from the PSU. The transients are detected by a probe that is either internally or externally connected to the PSU. This probe may be passive.

The method being locally performed within a server of the data center may be performed by a virtual container or a virtual machine. This method is based on transients detected by the probe. This method also identifies which service/workload/data has to be relocated or migrated, based on required reliability.

Examples and embodiments as described herein have one or more of the following advantages and preferable features:

It is an advantage that the method of the improving of quality of service of a data center is automated.

It is advantages that methods herein are continuously performed.

It is an advantage that relocation or migration of workload based on updated reliability data is automated.

It is a further advantage of the present disclosure that updating of data center reliability is automated.

It is a further advantage of the present disclosure that updating of data center reliability is automated.

It may be further noted that the above described embodiments are only given as examples and should not be limiting to the present exemplary embodiments, since other solutions, uses, objectives, and functions are apparent within the scope of the embodiments as claimed in the accompanying patent claims.

ABBREVIATIONS

AC alternating current
CPU central processing unit
DB database
DC data center
PSU power supply unit
QoS quality or service
VM virtual machine

The invention claimed is:

1. A method of improving of quality of service (QoS) of a data center, the data center comprising a power supply unit (PSU) and a server, wherein a power grid is fed to a power input of the PSU and where a power output of the PSU is connected and provides power to the server, where a probe, being adapted to detect transients on a power grid is connected to the power input of the PSU and to provide information over a signaling interface to the server to detect transients on the power grid, the method being performed in the server comprising:

receiving, from the probe across the signaling interface, information about transients having a strength that exceed a first threshold being detected on the power grid;

determining that transients that exceed the first threshold occur a number or rate exceeding a second threshold;

updating a reliability of the data center, based on the transients exceeding the first threshold and the second threshold;

requesting from a database that maintains workload information for the data center, in which the workload information includes a respective reliability required by each workload of the data center and in which each respective reliability is coded in a tag stored in the database, a workload having a required reliability higher than the updated reliability of the data center; and in response to receiving information of the workload having the required reliability higher than the updated reliability of the data center, sending, to a central management system, a request for migration of the workload to a second data center having a reliability equal to, or higher than, the required reliability of the workload.

2. The method according to claim 1, wherein the first and second thresholds are obtained from the database.

3. The method according to claim 1, wherein updating the reliability of the data center is performed periodically.

4. The method according to claim 1, wherein the PSU is comprised within a power system infrastructure of the data center, and wherein the server is comprised within a server infrastructure of the data center.

5. The method according to claim 1, where the method is performed by a data center management within the server.

6. The method according to claim 5, wherein the data center management resides in a container or a virtual machine of the server.

7. A method of improving quality of service (QoS) of two or more data centers, the method being performed in a central management server that is connected to said two or more data centers located at different locations, where the central management server has information about a reliability of each one of said two or more data centers, the method comprising:

receiving from a first data center of said two or more data centers a request for migration of a workload on a server operating within the first data center, the request determined by the first data center when the first data center:

receives, from a probe across a signaling interface, information about transients having a strength that exceed a first threshold being detected at a power input of a power supply unit (PSU) providing power to the server within the first data center, the PSU connected to a power grid;

determines that transients that exceed the first threshold occur a number or rate exceeding a second threshold;

updates a reliability of the first data center, based on the transients exceeding the first threshold and the second threshold; and requests from a database that maintains workload information for the first data center, in which the workload information includes a respective reliability required by each workload of the first data center and in which each respective reliability is coded in a tag stored in the database, a workload having a required reliability higher than the updated reliability of the first data center; and in response to the first data center receiving information of the workload having the required reliability higher than the updated reliability of the first data center, identifying a second data center of said two or more data centers having a reliability that is equal to, or higher than, the required reliability of the workload; and migrating the workload to the second data center.

8. The method according to claim 7, further comprising periodically receiving updated information about the reliability of said two or more data centers.

9. The method according to claim 7, being performed by an orchestrator of the central management server.

10. A server capable of improving a quality of service (QoS) of a data center, the data center comprising a power supply unit (PSU) and the server, where the PSU has a power input that is adapted to be fed by a power grid, where a power output of the PSU is adapted to be connected and to provide power to the server, where a probe is connected to the power input of the PSU, said probe being adapted to detect transients on the power grid and to provide information over a signaling interface to the server, the server comprising:
- a processing circuitry; and
- a memory containing instructions which, when executed by said processing circuitry, cause said server to perform operations to:
  - receive, from the probe across the signaling interface, information about transients having a strength that exceeds a first threshold being detected on the power grid;
  - determine that transients that exceed the first threshold occur a number or rate exceeding a second threshold;
  - update a reliability of the data center, based on the transients exceeding the first threshold and the second threshold;
  - request from a database that maintains workload information for the data center, in which the workload information includes a respective reliability required by each workload of the data center and in which each respective reliability is coded in a tag stored in the database, a workload having a required reliability higher than the updated reliability of the data center; and
  - in response to receipt of information of the workload having the required reliability higher than the updated reliability of the data center, send, to a central management server, a request for migration of the workload to a second data center having a reliability equal to, or higher than, the required reliability of the workload.

11. The server according to claim 10, wherein the instructions further cause said server to update the reliability of the data center periodically.

12. The server according to claim 10, where the probe comprises a passive probe.

13. The server according to claim 10, for which the PSU is comprised within a power system infrastructure of the data center, and where the server is comprised within a server infrastructure of the data center.

14. A central management server capable of improving a quality of service (QoS) of two or more data centers, the central management server connected to said two or more data centers located at different locations, the central management server to have information about a reliability of each one of said two or more data centers, the central management server comprising:
- a processing circuitry; and
- a memory containing instructions which, when executed by said processing circuitry;
  - cause the central management server to perform operations to:
  - receive from a first data center of said two or more data centers a request for migration of a workload on a server operating within the first data center, the request determined by the first data center when the first data center:
    - receives, from a probe across a signaling interface, information about transients having a strength that exceed a first threshold being detected at a power input of a power supply unit (PSU) providing power to the server within the first data center, the PSU connected to a power grid;
    - determines that transients that exceed the first threshold occur a number or rate exceeding a second threshold;
    - updates a reliability of the first data center, based on the transients exceeding the first threshold and the second threshold; and
    - requests from a database that maintains workload information for the data center, in which the workload information includes a respective reliability required by each workload of the data center and in which each respective reliability is coded in a tag stored in the database, a workload having a required reliability higher than the updated reliability of the data center; and
  - in response to the first data center in receipt of information of the workload having the required reliability higher than the updated reliability of the first data center, identify a second data center of said two or more data centers having a reliability that is equal to, or higher than, the required reliability of the workload; and
  - migrate the workload to the second data center.

15. The central management server according to claim 14, wherein the instructions further cause said server to periodically receive updated information about the reliability of said two or more data centers.

* * * * *